June 14, 1960
N. E. DILLEY
2,941,157
RADIO PROXIMITY FUZE HAVING MEANS FOR BALANCING
OUT BATTERY VOLTAGE FLUCTUATIONS
Filed Oct. 6, 1943
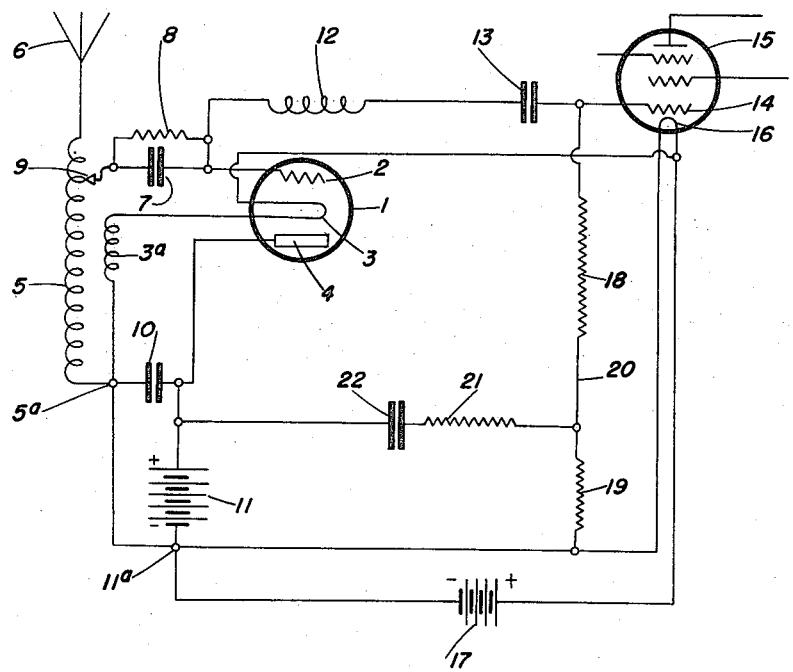
INVENTOR
*NEIL E. DILLEY*
BY
ATTORNEY

United States Patent Office 2,941,157
Patented June 14, 1960

2,941,157

RADIO PROXIMITY FUZE HAVING MEANS FOR BALANCING OUT BATTERY VOLTAGE FLUCTUATIONS

Neil E. Dilley, Washington, D.C., assignor to the United States of America as represented by the Secretary of the Navy Filed Oct. 6, 1943, Ser. No. 505,237

1 Claim. (Cl. 331—75)

This invention relates to oscillator circuits and more specifically to a novel circuit of this character which is particularly adapted for use in radio apparatus operable to detect the presence of a distant object by reflection of radio waves transmitted to the object from the oscillator.

One object of the present invention resides in the provision of an oscillator circuit having means for balancing out battery voltage fluctuations in the oscillator power supply.

Another object of the invention is to provide an oscillator circuit in which spurious pulses, due to battery fluctuations, are largely eliminated.

Still another object of the invention is to provide an oscillator circuit of simple arrangement which is highly efficient in operation.

These and other objects of the invention may be understood by reference to the accompanying drawing illustrating schematically one form of the new circuit.

Referring to the drawing, the numeral 1 designates a vacuum tube which, as shown, is of the triode type having a grid 2, a filament or other cathode 3 and an anode 4. An oscillator tank coil 5 is connected at one end to an antenna 6 of any suitable construction. It will be evident that electromagnetic wave energy generated in the oscillator is transmitted from the antenna 6 to distant objects so that certain objects may be detected through their reflecting action on the electromagnetic waves.

The grid 2 of the oscillator tube 1 is coupled through a grid capacitor 7 and a grid leak 8 to a suitable point on the tank coil 5, as shown at 9. The lower end of the coil 5 has a terminal 5a coupled to the anode 4 of the vacuum tube through a blocking capacitor 10. A source 11 of anode power voltage is connected at its positive side to the plate 4 and at its negative side 11a to the terminal 5a of the tank coil.

The oscillator, as shown, is of the grid-coupled type. That is, the output of the oscillator is taken from the grid 2 of the vacuum tube 1 and fed through a radio frequency choke coil 12 and a coupling capacitor 13 to a control grid 14 of an amplifier tube 15. The cathode 16 of the amplifier tube is energized by an "A" battery 17, and the cathode 3 of the oscillator tube is also energized by the battery 17 through terminals 11a and 5a and a radio frequency choke coil 3a.

An amplifier grid bias resistor 18 is connected at one end to the amplifier control grid 14 between the grid and the coupling capacitor 13, the other end of the resistor 18 being connected to one terminal of a balancing resistor 19 through a conductor 20. The other terminal of the balancing resistor 19 is connected to the negative terminal 11a common to the two batteries 11 and 17. A second balancing resistor 21 and a coupling capacitor 22 are connected in series between the conductor 20 and the positive terminal of battery 11.

The operation of the circuit is as follows: If the voltage of the anode battery 11 fluctuates and, for example, becomes higher, then a positive pulse is placed on the control grid 14 of the amplifier tube 15 through the capacitor 22. The positive pulse from the battery 11 increases the strength of the oscillations in the oscillator tube 1, with the result that more radio frequency voltage is developed and a more negative bias is placed on the grid 2. Thus, a negative pulse is fed through the capacitor 13 to the control grid 14 of the amplifier. However, the positive pulse is greater than the negative pulse, and by proper selection of the values of resistors 19 and 21 the positive pulse is divided so that it provides at the common point of said resistors a component equaling the negative pulse. Accordingly, the two equal and opposite pulses cancel out the fluctuations of the power source 11.

It will be understood that the battery fluctuations to which the present invention relates are such as are usually called "noise," and are numerous sudden small erratic changes (either up or down) in voltage as distinguished from the gradual downward voltage change due to consumption of the battery in service. The invention is particularly useful in connection with the tiny deferred action batteries widely used in proximity fuzes for missiles.

Such batteries, because of their smallness and very short life, and from the very nature of the service they perform, never become fully stabilized due to various causes, such as mechanical forces produced by the variations of motion of the fuzed missile, e.g. vibration, yawing, shocks, centrifugal force and the like, which are active throughout the useful life of the battery, as well as electrical, chemical and other effects inherent in the various individual cells themselves.

Such sudden small changes will produce voltage pulses that can traverse the capacitors 13 and 22, and neutralize each other when they reach the grid 14, whereby they provide instantaneous compensation for the voltage "noise," thus eliminating this annoying phenomenon, which would otherwise impair the accuracy of operation of the fuze.

What is claimed is:

An oscillator circuit including, a tank coil, an oscillator vacuum tube and an amplifier vacuum tube, each of said tubes having an anode, a grid and a cathode, means connecting a terminal of the tank coil to a terminal of the oscillator tube cathode, a source of anode voltage for said oscillator tube, and a grid bias resistor for the amplifier tube; in combination, a balancing circuit for removing electrical noise, comprising means for coupling the grid of the oscillator tube to the grid of the amplifier tube, and a pair of purely ohmic resistors having corresponding terminals connected to each other and to said grid bias resistor and corresponding opposite terminals connected to the cathode of said amplifier tube and to a terminal of a coupling capacitor, the opposite terminal of said capacitor being connected to said source of anode voltage, said pair of resistors dividing pulses from the anode of the oscillator tube in a ratio to provide voltage impulses substantially equal to the corresponding negative pulses delivered by the grid of the oscillator tube, whereby said positive voltage impulses substantially cancel said negative pulses at the amplifier grid.

References Cited in the file of this patent

UNITED STATES PATENTS

| 1,686,552 | Fairchild | Oct. 9, 1928 |
| 1,746,829 | Goodrum | Feb. 11, 1930 |
| 1,751,588 | Loewe | Mar. 25, 1930 |
| 2,223,982 | Bedford | Dec. 3, 1940 |
| 2,364,238 | Nicholson | Dec. 5, 1944 |